G. W. R. Bayley.
Railroad Rail Joint.
N° 29,235. Patented Jul. 24, 1860.
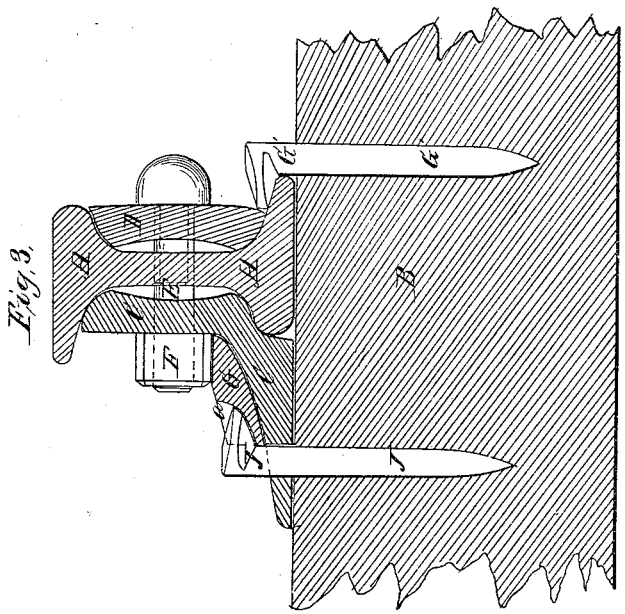
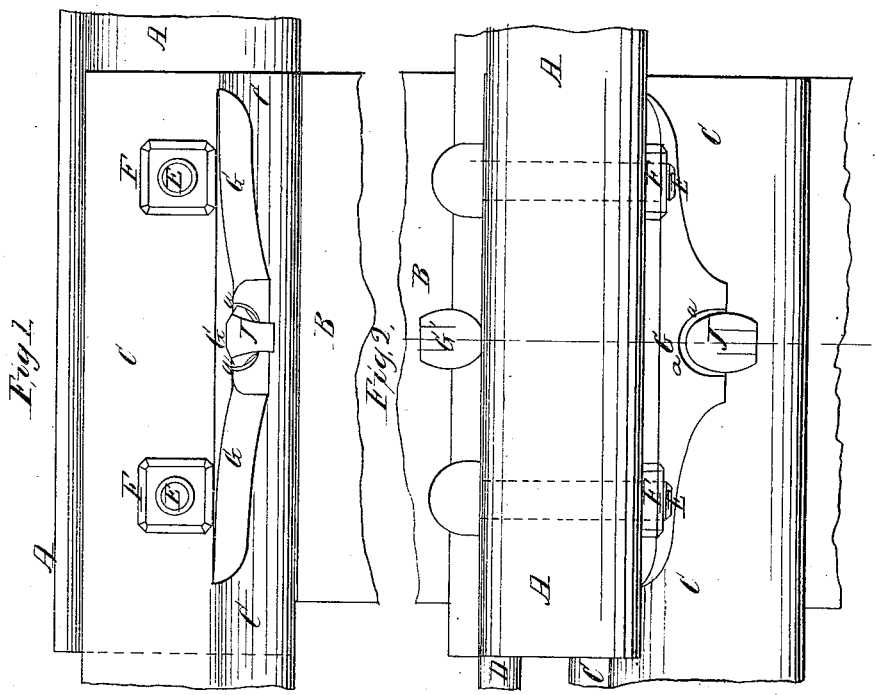
Witnesses
J. W. Coombs
R. S. Spencer
Inventor
G. W. R. Bayley
per Munn & Co
Attorney

UNITED STATES PATENT OFFICE.

G. W. R. BAYLEY, OF BRASHEAR, LOUISIANA.

MODE OF FASTENING NUTS ON RAILROAD-BOLTS.

Specification of Letters Patent No. 29,235, dated July 24, 1860.

*To all whom it may concern:*

Be it known that I, G. W. R. BAYLEY, of Brashear, in the parish of St. Mary's and State of Louisiana, have invented a new and Improved Nut-Fastening for the Nuts of Railroad-Rail Bolts; and I do hereby declare that the following is a full, clear, and exact description thereof, reference being had to the accompanying drawings, forming a part of this specification, in which—

Figure 1, represents a side view of one end of a railroad rail, showing a section of a four-bolt bracket with the same secured under the thin lip of the rolling surface of the rail, outside of the same, by bolts and nuts. My improved nut fastening is here shown, with the hold-down spike securing the same under the nuts, and the whole to the cross-tie. Fig. 2, is a plan view of Fig. 1. Fig. 3 is a transverse section taken through Figs. 1, and 2, as indicated by the red lines *x*, *x*, in these figures.

Similar letters of reference indicate corresponding parts in the several figures.

This invention relates to an improvement in railroad rails, where a fishing bar is used on the inside of the rail at the rail's joints, or at intermediate points between the joints, with a bracket placed on the outside of the rail directly opposite to the fishing bar, and the two (bracket and fishing bar) are secured to the sides of the rail, under the lips of the rail table, and base, by bolts and nuts. The fishing bars are used to give support to the inside lip of the rail table; and the brackets are used to support the thin lip on the outside of the rail table, at the same time to give an artificial bearing to the rail base.

My invention consists in the employment or use of a suitable piece of cast iron, or other metal, inserted under the nuts of the bolts used for securing the bracket and fishing bar to the sides of the rail, when the nut guard is held securely under the nuts, and the fishing bar, bracket, and rail itself, are all secured to the cross-tie by one or more hold down spikes, as will be hereinafter described and represented.

In the drawings, A represents my improved reversible Z-rail, which is represented as being secured to the cross-ties, B, at the rail joint. The bracket, C, outside, and the fishing bar, D, on the inside of the rail, are bolted together by bolts, E, (and nuts, F,) which pass laterally through the stem of the rail; the bolt is passed through from the inside, so that the nuts will be on the outside of the rail.

Under the nuts, F, of bolts, E, is placed a nut guard, G, which may be made of metal, and shaped as represented in the drawings, so that its under surface will conform to the outer surface of the bracket's base, and its upper surface fit closely under the nuts, F, where it is secured in place. In the edge of this nut guard, G, is a recess, *a*, which receives the head of the hold-down spike, J, when the same is driven into the cross-tie. This holding spike, J, is driven through a hole punched through the base portion of the bracket, C, as clearly shown by Fig. 3, and after the fishing-bar and bracket are bolted to the rail, and the nut guard placed under the nut or nuts, F, the spike is firmly driven down into the cross-tie until the head is sunk into the recess in the nut-guard. This spike thus holds the nut-guard immovable, and with the addition of a spike, C', on the opposite or inside of the rail base, the rail, bracket, fishing-bar, and nut-guard are confined securely to the cross-tie, and the nuts of the bolts prevented from unscrewing, or becoming loose, by the jar and concussion of passing trains over the rail. The drawings represent the nut fastening applied to a bracket and fishing-bar for securing the ends of the rails together at the joints; in which instance a four-bolt bracket and corresponding fishing-bar are used; two nut-guards in this instance will serve to secure the four nuts, with one hold-down spike for each nut-guard, and a spike on both ends of the rails, inside of the rail; these four spikes will thus answer to secure the rail and bracket down to the cross-tie, and, at the same time, the nut-guards under the nuts. But I do not wish to confine myself to this compound fastening to be used only for securing the ends of the rails together simply as a rail joint fastening, for when the bracket or fishing-bar, (one or both,) are used simply as rail-supports, that is, supports for the rail's table or head, or as a brace, or for giving an artificial width to the base of the rail, they are placed at the rail's center, or at intermediate points between the rail's joint, and secured against the side of the rail by bolts and nuts in the same manner as above described: the nut guards are here used, and the hold-down spikes for securing the guards in place; but at these intermediate points a one-bolt, or two-bolt, bracket will be used.

I am well aware that it is not new to prevent bolt heads or nuts from turning by inserting below them a key or washer, and I do not therefore lay claim to this principle, but What I do claim, and desire to secure by Letters Patent, is—

Locking the nuts of railroad rail bolts by means of a nut-guard, G, inserted under them, when the same is held in place under the nuts by one or more hold-down spikes countersunk into notches or recesses therein; said spike or spikes serving, at the same time, to secure the bracket and rail down to the cross-tie, essentially in the manner herein described.

G. W. R. BAYLEY.

Witnesses:
BAILEY P. VINSON,
WM. H. LEWIS.